US006729226B2

United States Patent
Mangiapane

(10) Patent No.: US 6,729,226 B2
(45) Date of Patent: May 4, 2004

(54) MULTIPLE BEVERAGE PREPARATION DEVICE

(76) Inventor: Joseph Mangiapane, 224 Grassmere Ave., Oakdale, NY (US) 11769

( * ) Notice: Subject to any disclaimer, the term of this patent is extended or adjusted under 35 U.S.C. 154(b) by 0 days.

(21) Appl. No.: 10/128,914

(22) Filed: Apr. 24, 2002

(65) Prior Publication Data

US 2003/0200871 A1 Oct. 30, 2003

(51) Int. Cl.⁷ .............................. A47J 31/00; A47J 31/24
(52) U.S. Cl. ..................... 99/291; 99/289 P; 99/307
(58) Field of Search .................. 99/291, 289 P, 99/307, 289 R, 295, 304, 305, 306

(56) References Cited

U.S. PATENT DOCUMENTS

| 4,421,014 A | * | 12/1983 | Vicker ................... 99/289 P |
| 4,941,399 A | * | 7/1990 | Zucchetti ................. 99/289 P |
| 4,944,217 A | | 7/1990 | Watanabe |
| 5,134,924 A | * | 8/1992 | Vicker ..................... 99/289 R |
| 5,490,447 A | | 2/1996 | Giuliano |
| 6,360,650 B1 | | 3/2002 | Mangiapane |

FOREIGN PATENT DOCUMENTS

| DE | 3935384 | * | 5/1991 | ................ 99/307 |

* cited by examiner

*Primary Examiner*—Reginald L. Alexander
(74) *Attorney, Agent, or Firm*—Collard & Roe, P.C.

(57) ABSTRACT

A device for the preparation of many different beverages simultaneously in one machine. The device comprises a housing containing a primary reservoir for holding a liquid that is used to make a beverage. Disposed within the housing is a rotatable tray and a motor for driving this tray. The rotatable tray contains a plurality of receptacles. These receptacles are for receiving a concentrate solution for flavoring the liquid. In addition, disposed within the housing is a conduit for transporting the liquid from the reservoir to the rotatable tray. In this case the conduit allows the reservoir to be in fluid connection with the tray.

15 Claims, 4 Drawing Sheets

MULTIPLE BEVERAGE PREPARATION DEVICE

BACKGROUND OF THE INVENTION

Field of the Invention

The invention relates to a multiple beverage preparation device that is designed to dispense many different types of beverages from a single magazine tray.

SUMMARY OF THE INVENTION

The invention relates to a device for the preparation of multiple beverages. The device comprises a housing containing a primary reservoir for holding a liquid that is used to make a beverage. Disposed within the housing is a rotatable tray. The rotatable tray contains a plurality of receptacles. These receptacles are for receiving a concentrate solution used for flavoring the liquid. In addition, disposed within the housing is a conduit for transporting the liquid from the reservoir to the rotatable tray. In this case, the conduit allows the reservoir to be in fluid connection with the tray.

In addition, disposed within this tray is a heater for heating the liquid within the housing. This allows the device to make hot beverages after the liquid has been poured into the reservoir. There is also least one additional reservoir disposed within the housing adjacent to the primary reservoir. This additional reservoir is designed to receive liquid or preferably water from the primary reservoir and measure the amount of liquid using a liquid position sensor disposed within the additional reservoir. For example when the liquid is below the liquid position sensor within the additional housing, a valve connecting the primary reservoir to the additional reservoir is open, allowing liquid to flow from the primary reservoir to the additional reservoir. However, when liquid reaches or surpasses the liquid position sensor within the additional housing, the valve is closed, stopping the flow of liquid from the primary reservoir to the additional reservoir.

There is also a pump disposed within the housing for pumping the liquid from the additional reservoir through the conduit and into the rotatable tray. This pump pulls liquid from the additional housing and pushes it through the conduit into the tray so that this liquid contacts the concentrate disposed within the receptacle to create the desired beverage. The concentrate is loaded into each receptacle using a reusable filter that is designed to receive a concentrated solution for flavoring. Thus, a user can take this reusable filter and insert any type of concentrated solution such as caffeinated or decaffeinated coffee grounds, hot chocolate powder, a tea bag, or any other form of concentrate solution designed to make a flavored beverage.

The housing also contains a spout adjacent to the rotatable tray wherein this spout is designed to funnel the liquid into a stream after said liquid has left the rotatable tray. This stream then pours into a cup or pot to store the flavored beverage. The housing also contains a drainage tray designed to receive excess beverage so that if the flavored beverages overflows the cup or pot, the beverage simply flows into the drainage tray.

The rotatable tray also contains a series of label plates so that there is at least one label plate disposed adjacent to each of the receptacles. In this way, a user can mark a label plate adjacent to a particular receptacle so that the user knows the type of concentrated solution disposed within each receptacle. These label plates can contain indicia such as color codes or letters or numbers so that a user can keep track of the types of flavored crystals placed in the receptacles.

There is also a motor disposed within the housing. The motor is for driving the tray around so that the receptacles line up with the conduit dispensing the water or other type fluid.

BRIEF DESCRIPTION OF THE DRAWINGS

Other objects and features of the present invention will become apparent from the following detailed description considered in connection with the accompanying drawings which disclose a plurality of embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1A:
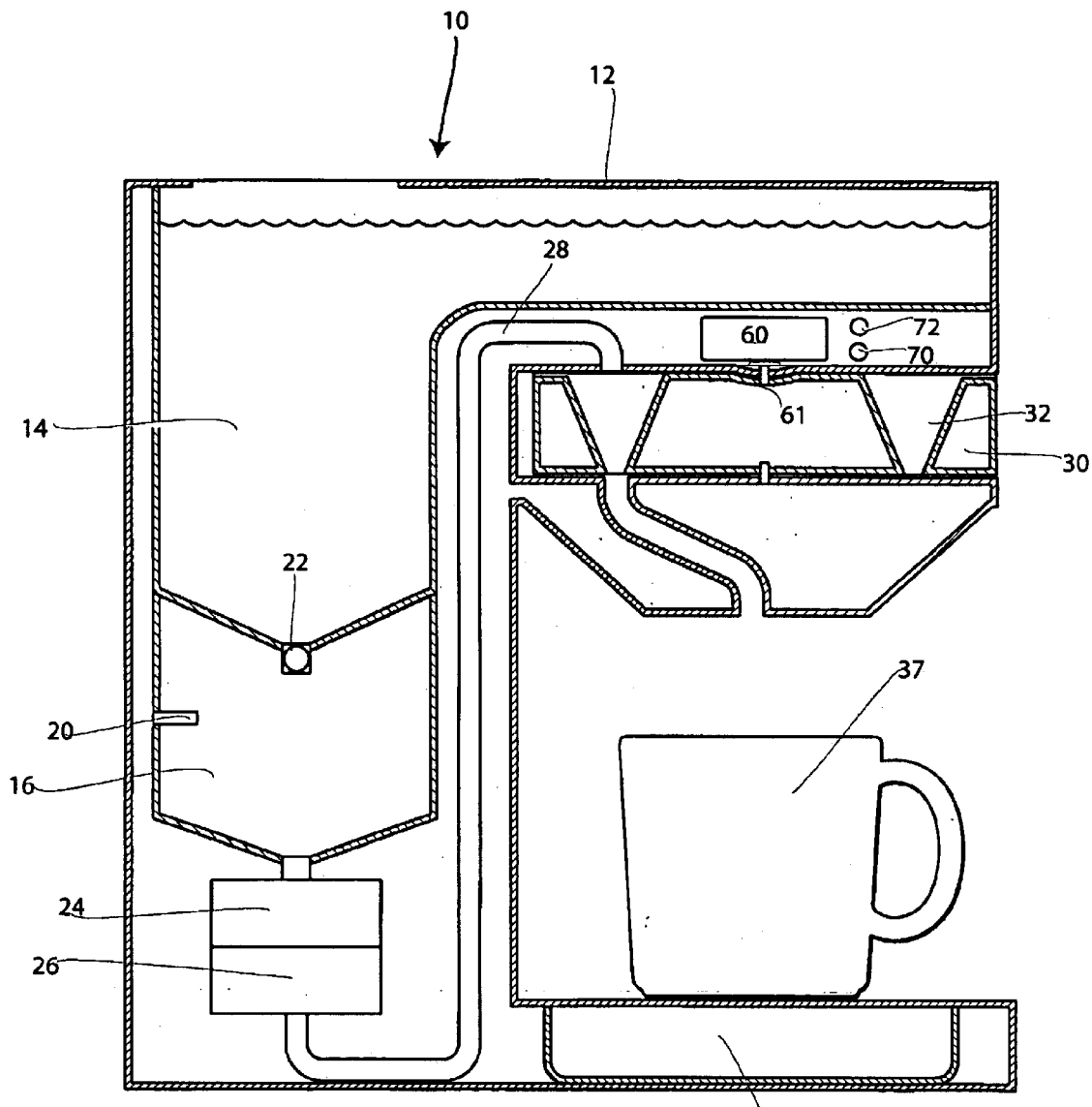
FIG. 1A is a cross-sectional view of the device.
Figure 1B:
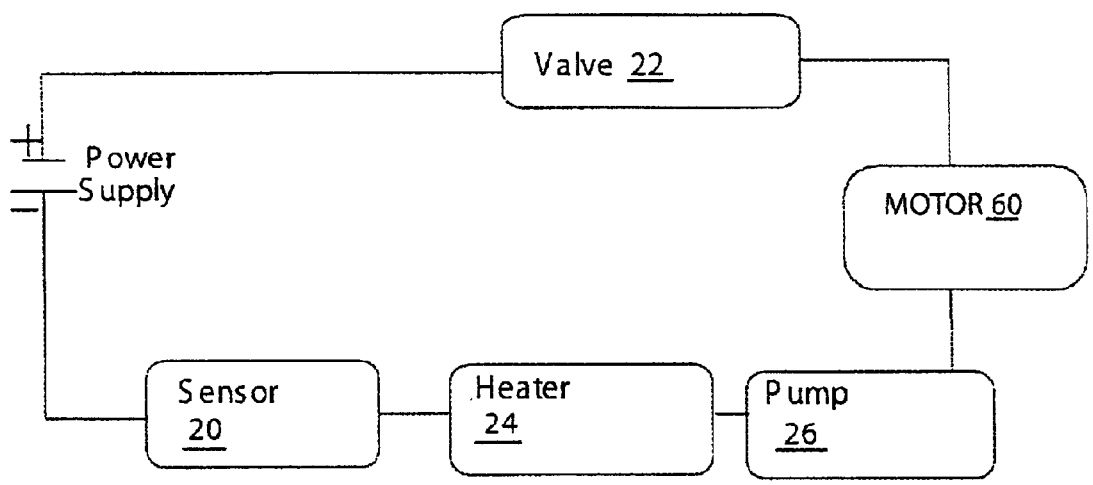
FIG. 1B is a schematic block diagram of the electrical connection within the device.

FIG. 1A refers to a cross-sectional view of the multiple beverage preparation device 10. In addition, FIG. 1B shows a schematic block diagram of the electrical connection between the components. FIG. 1A shows a housing 12, containing a first or primary reservoir 14 and a secondary reservoir 16. Connecting the primary reservoir 14 with the secondary reservoir 16 is a valve that opens and closes based upon the level of liquid housed within the secondary reservoir 16. Disposed within the secondary reservoir is a liquid level sensor 20 that is designed to read the level of the liquid in the secondary reservoir 16. If the level of the liquid is above liquid level sensor 20 then a valve 22, that fluidly connects first reservoir 14 with second reservoir 16, either shuts off to stop the flow of water, or alters its position to reduce the flow of water from first reservoir 14 to second reservoir 16. Once the water or liquid exceeds level of sensor, the valve changes its position so that the amount of water entering into second reservoir 16 does not exceed the amount of water leaving second reservoir 16.

Figure 3:
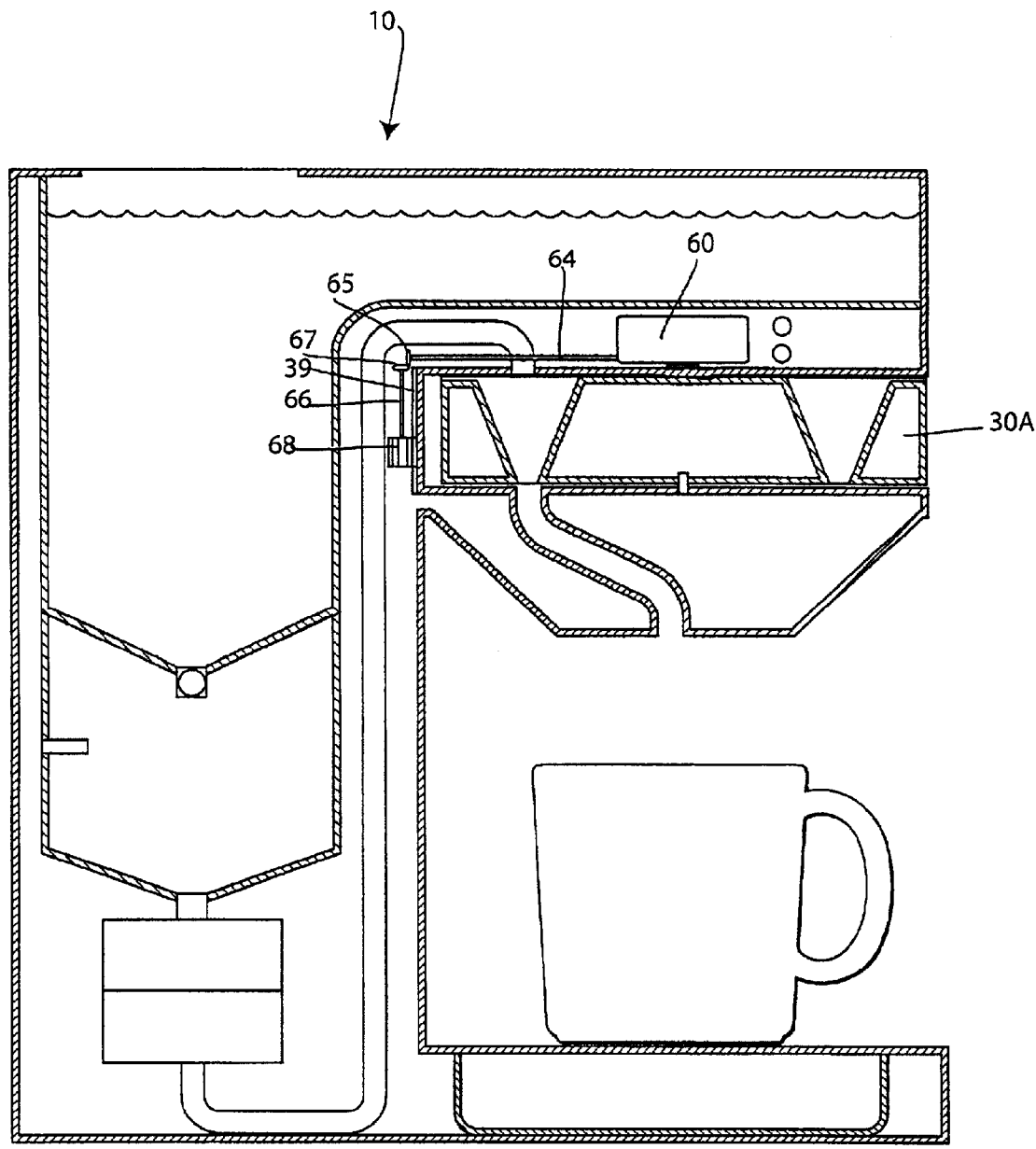
FIG. 3 is a perspective view of the second embodiment of the device.

There is also a motor 60 as shown in FIGS. 1A, 1B, and 3 wherein this motor rotates tray 30 when either rotate button 70 or rotate button 72 is pushed. For example, if rotate button 70 is pushed, tray 30 can rotate in a clockwise direction. If rotate button 72 is pushed, tray 30 can rotate in a counter clockwise direction.

Motor 60 also controls the amount of rotation of tray 30 so that each press on buttons 70 or 72 results in an angular rotation sufficient to place a new receptacle container under tube 28 for refill.

Figure 2:
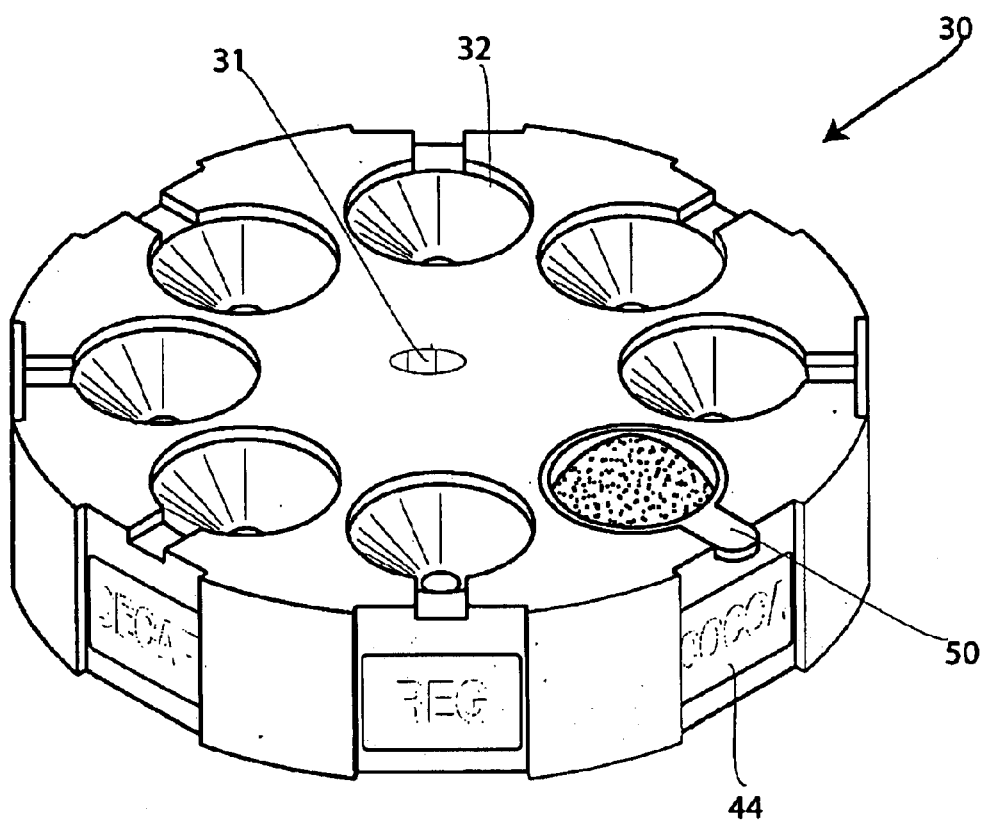
FIG. 2 is a perspective view of the tray.

As shown in FIG. 1A, in a first embodiment, tray 30 can be driven in a central region by motor 60 wherein motor 60 contains an axle 61 that extends into a central region or hole 31 of tray 30 shown in FIG. 2. In a second embodiment as shown by FIG. 3, tray 30A is driven at its periphery via a linkage 62 which comprises a first axle 64, a first gear 65 coupled to first axle 64, a second axle 66, a second gear 67 coupled to second axle 66 and a third gear 68 coupled to second axle 66. FIG. 3 shows tray 30A containing a plurality of teeth 39 wherein these teeth 39 mesh with third gear 68.

Once the water leaves second reservoir 16, it flows into heater 24 where the water is heated up to a temperature of approximately 150–180 degrees Fahrenheit which is appropriate for brewing coffee or tea. Next, the water flows into a pump 26 which pumps the water through tube 28 to tray 30. Once the water has flowed into tray 30 it next flows into receptacle 32 which contains a concentrate for making a beverage. The concentrate is most likely ground coffee beans which are placed within a filter or strainer 50 (FIG. 2) and used to add flavor to the water being poured into receptacle 32. Once the water flows through receptacle 32 it flows down through chamber 34 and into a coffee cup 37. Coffee cup 37 is heated by a hot plate 38 disposed within housing 12.

As shown in FIG. 2 there is a tray 30 that contains a series of receptacles 32. Disposed in one of the receptacles is a plurality of particles that are used to flavor water or any other type beverage that flows through these receptacles and through a strainer 50. Here, the tray 30 contains a series of label plates 44 that are positioned adjacent to each receptacle 32 so that each label plate 44 can be used to mark the type of concentrate that is disposed within each receptacle. Tray 30 contains a central hole 31 which can receive axle 61 therein so that tray 30 can rotate around as driven by motor 60.

In this case, once the water passes through strainer 50 and through the flavored particles, the water passes down through a second conduit and into cup 37 shown in FIG. 1A. Essentially, the purpose of this invention is to provide a carousel type dispenser that is used to deliver different types of ground-flavored particles that are used to flavor coffee, tea or any other type beverage. Because there are a series of different receptacles 32 disposed within a rotating tray 30, this design allows a user to make multiple different cups of coffee using different flavoring particles without removing rotatable tray 30.

Accordingly, while a plurality of embodiments of the present invention has been shown and described, it is to be understood that many changes and modifications may be made thereunto without departing from the spirit and scope of the invention as defined in the appended claims.

What is claimed is:

1. A device for the preparation of multiple beverages comprising:
    a) a housing containing at least one reservoir including at least one primary reservoir and at least one additional reservoir for holding a liquid;
    b) a rotatable tray disposed within said housing;
    c) a plurality of receptacles disposed within said rotatable tray, said receptacles for receiving a concentrate solution for flavoring said liquid;
    d) a valve connecting said at least one primary reservoir to said at least one additional reservoir;
    e) a liquid position sensor disposed within said at least one additional reservoir wherein said liquid position sensor opens said valve when said liquid is below said liquid position sensor and closes said valve when said liquid has either reached or passed said liquid position sensor;
    g) a conduit for transporting said liquid from said at least one reservoir to said rotatable tray within said housing; and
    h) a motor disposed within said housing, said motor being coupled to said rotatable tray and for driving said rotatable tray about an axis within said housing.

2. The device as in claim 1, further comprising a heater for heating said liquid within said housing.

3. The device as in claim 1, further comprising a pump for pumping liquid from said at least one reservoir through said conduit and into said rotatable tray.

4. The device as in claim 1, further comprising a spout disposed within said housing adjacent to said rotatable tray wherein said spout is designed to funnel said liquid into a stream after said liquid has left said rotatable tray.

5. The device as in claim 1 wherein said rotatable tray further comprises a series of label plates wherein there is at least one label plate disposed adjacent to each of said receptacles.

6. The device as in claim 1, wherein said motor is designed to rotate from a first position to a second position wherein when said motor is coupled to said tray, said first position aligns a first receptacle of said plurality of receptacles with said conduit and said second position aligns a second receptacle of said plurality of receptacles with said conduit.

7. The device as in claim 1, further comprising an axle, coupled at a first end to said motor and at a second end to said tray wherein said motor drives said axle which in turn drives said tray.

8. The device as in claim 1, wherein said tray further comprises a plurality of teeth disposed about a peripheral surface of said tray, and wherein said device further comprises a linkage which couples said motor to said peripheral surface of said tray.

9. The device as in claim 8, wherein said linkage comprises a first axle extending out from said motor, a first gear coupled to said first axle, a second axle, a second gear coupled to said second axle wherein said second gear meshes with said first gear, and a third gear coupled to said second axle opposite said second gear, said third gear for meshing with said plurality of teeth on said peripheral surface of said tray wherein said motor drives said first axle which in turn drives said second axle wherein said third gear meshes with said plurality of teeth on said tray driving said tray in a rotatable manner.

10. The device as in claim 1, further comprising a reusable filter for filtering a concentrate within said housing said reusable filter being insertable into each of said receptacles in said rotatable tray.

11. The device as in claim 10, wherein said reusable filter further comprises a handle.

12. The device as in claim 11, wherein said tray further comprises a filter handle indent for receiving said filter handle.

13. A device for the preparation of multiple beverages comprising:
    a) a housing containing at least one reservoir for holding a liquid;
    b) a rotatable tray disposed within said housing;
    c) a plurality of receptacles disposed within said rotatable tray, said receptacles for receiving a concentrate solution for flavoring said liquid;
    d) a conduit for transporting said liquid from said at least one reservoir to said rotatable tray within said housing; and
    e) a motor disposed within said housing, said motor being coupled to said rotatable tray and for driving said rotatable tray about an axis within said housing; and
    f) a spout disposed within said housing adjacent to said rotatable tray wherein said spout is designed to funnel said liquid into a stream after said liquid has left said rotatable tray.

14. A device for the preparation of multiple beverages comprising:
   a) a housing containing at least one reservoir for holding a liquid;
   b) a rotatable tray disposed within said housing;
   c) a plurality of receptacles disposed within said rotatable tray, said receptacles for receiving a concentrate solution for flavoring said liquid;
   d) a conduit for transporting said liquid from said at least one reservoir to said rotatable tray within said housing;
   e) a motor disposed within said housing, said motor being coupled to said rotatable tray and for driving said rotatable tray about an axis within said housing; and
   f) a reusable filter having a handle for filtering a concentrate within said housing said reusable filter being insertable into each of said receptacles in said rotatable tray.

15. The device as in claim 14, wherein said tray further comprises a filter handle indent for receiving said filter handle.

* * * * *